US011151186B2

(12) United States Patent
Doggett et al.

(10) Patent No.: US 11,151,186 B2
(45) Date of Patent: Oct. 19, 2021

(54) SYSTEMS AND METHODS FOR PRESENTING AN INTERACTIVE NARRATIVE

(71) Applicant: Disney Enterprises, Inc., Burbank, CA (US)

(72) Inventors: Erika Doggett, Burbank, CA (US); Alethia Shih, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 198 days.

(21) Appl. No.: 16/011,514

(22) Filed: Jun. 18, 2018

(65) Prior Publication Data

US 2019/0384826 A1    Dec. 19, 2019

(51) Int. Cl.
*G06F 16/435* (2019.01)
*G06F 16/48* (2019.01)
*G06F 16/438* (2019.01)
*G06F 40/205* (2020.01)

(52) U.S. Cl.
CPC .......... *G06F 16/435* (2019.01); *G06F 16/438* (2019.01); *G06F 16/48* (2019.01); *G06F 40/205* (2020.01)

(58) Field of Classification Search
CPC .............................. G06F 40/205; G06F 40/30
See application file for complete search history.

(56) References Cited

U.S. PATENT DOCUMENTS

| 9,558,758 B1* | 1/2017 | Piersol | H04M 9/08 |
| 2011/0044431 A1* | 2/2011 | Klemm | H04M 1/72519 379/32.01 |
| 2014/0040312 A1* | 2/2014 | Gorman | G06F 16/245 |
| 2014/0229154 A1* | 8/2014 | Leydon | G06F 40/47 704/2 |
| 2015/0161107 A1* | 6/2015 | Tur | G06F 40/30 704/9 |
| 2016/0034161 A1* | 2/2016 | Kaltner | H04N 7/141 715/716 |
| 2017/0243517 A1* | 8/2017 | Midmore | G06F 40/56 |

* cited by examiner

*Primary Examiner* — William Spieler
(74) *Attorney, Agent, or Firm* — Artegis Law Group, LLP

(57) ABSTRACT

Systems, devices, and methods are disclosed for presenting an interactive narrative. An apparatus includes a user interface. The apparatus also includes one or more processors operatively coupled to the user interface and a non-transitory computer-readable medium. The non-transitory computer-readable medium stores instructions that, when executed, cause the one or more processors to present a first piece of content corresponding to a given narrative via the user interface. The given narrative includes one or more characteristics. The one or more processors are caused to receive user input via the user interface. The one or more processors are caused to classify the user input into one of a plurality of response models. The one or more processors are caused to dynamically respond to the user input by presenting a second piece of content. The second piece of content is based on a selected response model corresponding to the user input.

22 Claims, 6 Drawing Sheets

SYSTEMS AND METHODS FOR PRESENTING AN INTERACTIVE NARRATIVE

SUMMARY

Embodiments of the present disclosure include systems, methods, devices, and apparatus capable of presenting an interactive narrative, including, for example, user interfaces as well as interconnected processors and/or circuitry, to present content to a user and receive user input via a user interface.

In accordance with embodiments of the present disclosure, an apparatus includes a user interface. The apparatus includes one or more processors operatively coupled to the user interface and a non-transitory computer-readable medium. The non-transitory computer-readable medium stores instructions that, when executed, cause the one or more processors to perform a number of operations. One such operation is to present a first piece of content corresponding to a given narrative via the user interface. The given narrative includes one or more characteristics. Another such operation is to receive user input via the user interface. Yet another such operation is to classify the user input into one of a plurality of response models. Another such operation is to dynamically respond to the user input by presenting a second piece of content. The second piece of content is based on a selected response model corresponding to the user input.

In embodiments, the user interface is configured to simultaneously receive the user input and present content.

In embodiments, the plurality of response models include a first response model for user input corresponding to the one or more characteristics of the narrative. The plurality of response models also include a second response model for other user input.

In embodiments, classifying the user input into the first response model causes the second piece of content to be based on the user input.

In embodiments, classifying the user input into the second response model causes the second piece of content to indicate the user input does not correspond to the one or more characteristics of the given narrative.

In embodiments, the one or more processors are configured by machine-readable instructions to perform more operations. One such operation is to present a third piece of content corresponding to the given narrative and continuing the given narrative based on an end of the first piece of content.

In embodiments, the one or more processors are configured by the instructions to perform another operation. Such an operation is to filter the user input based on breaching a threshold value of an obscenity filter.

In embodiments, breaching the threshold value of the obscenity filter causes the second piece of content continues the given narrative from an end of the first piece of content.

In accordance with additional aspects of the present disclosure, a method for presenting an interactive narrative includes a number of operations. One such operation includes presenting a first piece of content corresponding to a given narrative via the user interface. The given narrative includes one or more characteristics. Another such operation includes receiving user input via the user interface. Yet another such operation includes classifying the user input into one of a plurality of response models. Another such operation includes dynamically responding to the user input by presenting a second piece of content. The second piece of content is based on a selected response model corresponding to the user input In embodiments, the first piece of content and the second piece of content are obtained from the non-transitory computer-readable medium.

In embodiments, the second piece of content is dynamically generated using a generative language model.

In embodiments, the user input is classified using natural language processing.

In embodiments, the user input is classified by parsing the user input into one or more component parts.

In embodiments, the plurality of response models includes a first response model for user input corresponding to the one or more characteristics of the narrative. The plurality of response models also includes a second response model for other user input.

In embodiments, classifying the user input into the first response model causes the second piece of content to be based on the user input.

In embodiments, a break in content is presented after a first piece of content.

In embodiments, the method further includes filtering the user input based on breaching a threshold value of an obscenity filter.

In embodiments, breaching the threshold value of the obscenity filter causes the second piece of content continues the given narrative from an end of the first piece of content.

In accordance with additional aspects of the present disclosure, an electronic device includes a user interface. The electronic device includes one or more processors operatively coupled to the user interface and a non-transitory computer-readable medium. The non-transitory computer-readable medium stores instructions that, when executed, cause the one or more processors to perform a number of operations. One such operation is to present a first piece of content corresponding to a given narrative via the user interface. The given narrative includes one or more characteristics. Another such operation is to receive user input via the user interface. Yet another such operation is to send the user input to a server. Another such operation is to receive, from the server, a second piece of content. Yet another such operation is to present the second piece of content. The second piece of content is based on a selected response model corresponding to the user input.

In embodiments, the user interface is configured to simultaneously receive the user input and present content.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to system, methods, and devices for presenting an interactive narrative. In various deployments described herein, the system may present a first piece of content corresponding to a given narrative. At any time during the presentation of the first piece of content, user input may be received in the form of typing, speech, motion capture, and/or other input. The user input may be classified into a response model. A response to the user input may be dynamically presented as a second piece of content based on a given response model corresponding to the user input.

Figure 1:
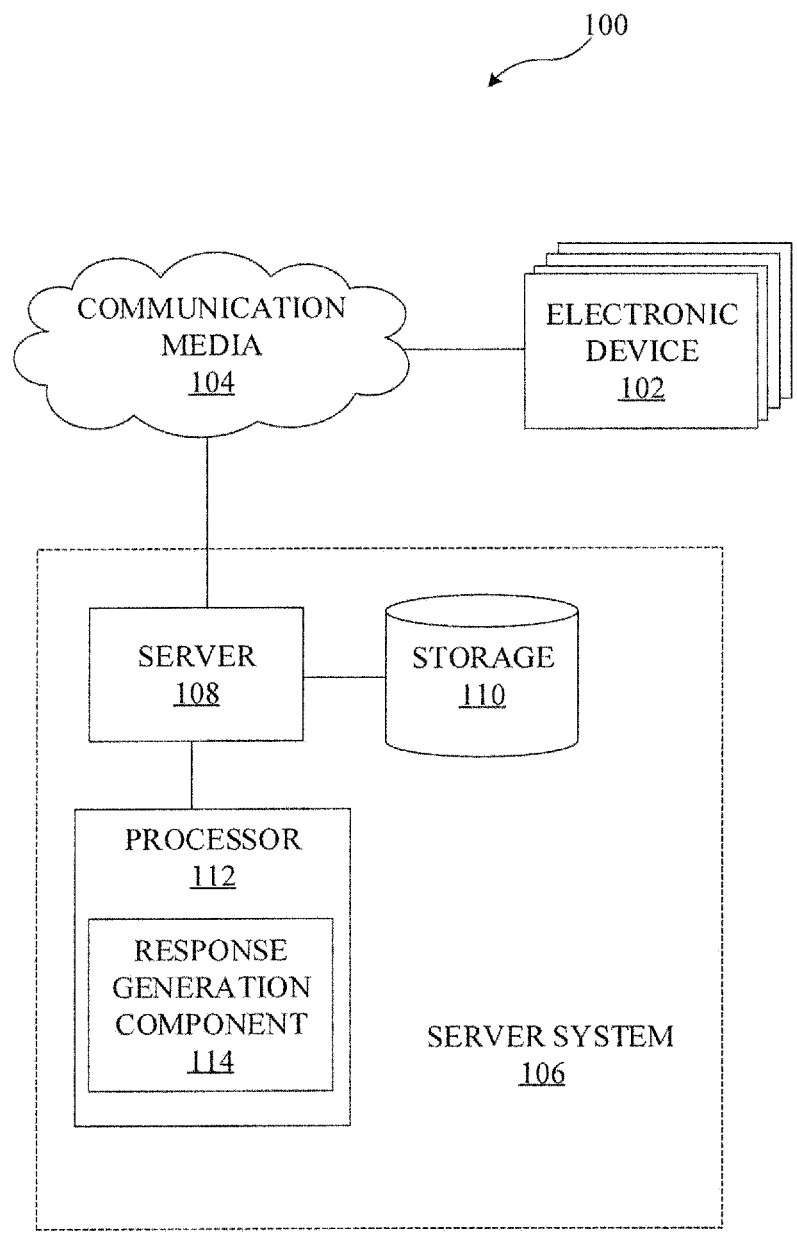
FIG. 1 illustrates an example environment in which embodiments of the disclosure may be implemented.

Before describing the technology in detail, it is useful to describe an example environment in which the presently disclosed technology can be implemented. FIG. 1 illustrates one such example environment 100.

Environment 100 may be used in connection with implementing embodiments of the disclosed systems, methods, and devices. By way of example, the various below-described components of FIG. 1 may be used to present an interactive narrative to a user. For example, electronic device 102 may present a first piece of content to a user and simultaneously receive user input. The first piece of content may be "this is a story about three boys, Rory, Blake, and Alex, on a race around the world." The user may ask, "Who is Rory?" The user input may be sent to server system 106 via communication media 104. Server system 106 may classify, parse, and otherwise process the user input via processor 112 and response generation component 114. For example, the user input may be separated into component parts so "Who" corresponds to a question, "is" corresponds to a verb connecting "Who" to "Rory," and Rory" is a noun phrase that corresponds to one of the characters in the narrative. Server system 106 may also generate, obtain, or otherwise determine an appropriate response based on how the user input is processed. For example, pre-generated content may have metadata corresponding to information on Rory. This pre-generated content may be obtained from storage 110 and/or storage 206. The response may be in the form of a second piece of content. The second piece of content may be sent to electronic device 102 via communication media 104. The second piece of content may be presented to the user via electronic device 102. For example, electronic device 102 may present pre-generated content corresponding to information about Rory: "Rory is a boy who loves to sail and eat chocolate." In embodiments, electronic device 102 may include server system 106 or components of server system 106 such that the processing of user input and the determining of the response is done on electronic device 102.

In embodiments, the first piece of content may be the beginning of the narrative, or the first piece of content may continue the narrative from another session. Content may include text, audio, video, virtual reality content, augmented reality content, and/or other content. In some embodiments, the narrative may be a novel, poem, short story, play, musical, and/or other narratives. In embodiments, the narrative may be selected by a user from one or more pre-defined categories. The pre-defined categories may be based on genre, plot, character, location, setting, universe, time of day, date, and/or other factors. In embodiments, the narrative includes one or more characteristics. The one or more characteristics may include a theme, character, setting, plot, ending, and/or other characteristics. For example, as described above, the narrative may be about a group of people in a race around the world through various landscapes and cities.

Electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content to a user and receive user input. In some embodiments, electronic device 102 may parse, classify, and otherwise process user input. In embodiments, electronic device 102 may store content.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including content, user input, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases.

As mentioned, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, one of skill in the art will recognize other ways to implement communication media 104 for communications purposes.

Likewise, it will be appreciated that a similar communication medium may be used to connect or communicatively couple server 108, storage 110, and/or processor 112 to one another in addition to other elements of environment 100. In example implementations, communication media 104 may be or include a wired or wireless wide area network (e.g., cellular, fiber, and/or circuit-switched connection, etc.) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102, such as, for example, content, user input, security and encryption information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102. Processor 112 may include response generation component 114 capable of parsing, classifying, and otherwise processing user input and determining, obtaining, or generating responses that server system 106 has collected, received, etc. from electronic device 102. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, a module, or the like, and may be implemented in various forms, including, for example, an integrated circuit or collection thereof, a printed circuit board or collection thereof, or in a discrete housing/package/rack or multiple of the same. Server 108 may update information stored on electronic device 102. Server 108 may send/receive information to/from electronic device 102 in real-time or sporadically. Further, server 108 may implement cloud computing capabilities for electronic device 102. Upon studying the present disclosure, one of skill in the art will appreciate that environment 100 may include multiple electronic devices 102, communication media 104, server systems 106, servers 108, storage 110, processors 112, and/or response generation components 114.

Figure 2:
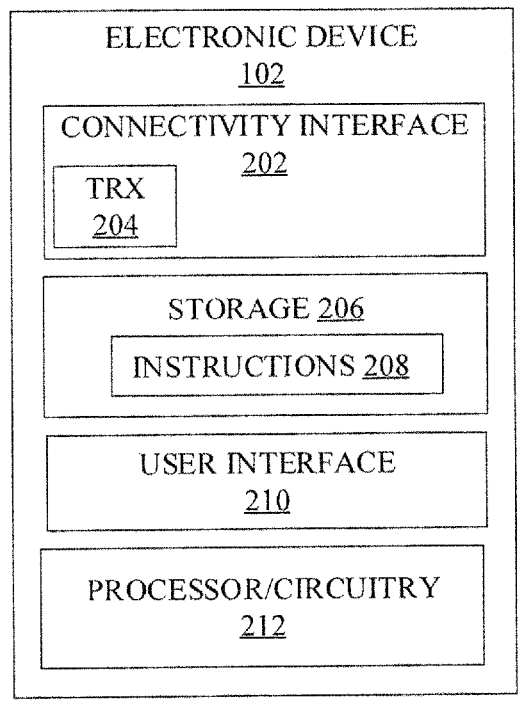
FIG. 2 illustrates an example electronic device in accordance with embodiments of the disclosure.

FIG. 2 depicts example electronic device 102, which includes an example of additional aspects of the present disclosure that may be implemented in connection with example environment 100. By way of example, the various below-described components of FIG. 2 may be used to present an interactive narrative to a user.

For example, the first piece of content may be presented to the user via user interface 210. Electronic device 102 may simultaneously receive user input via user interface 210. As described herein, server system 106 may process the user input and generate, obtain, or determine an appropriate response based on the processed user input. In some embodiments, processor/circuitry 212 may perform these operations. In embodiments, pre-generated content may be stored in storage 110 and/or storage 206. The response may be presented as a second piece of content to the user via user interface 210.

As illustrated, electronic device 102 may include connectivity interface 202, which may further include transceiver 204 to communicatively couple electronic device 102 to, for example, server system 106, or other electronic devices via communication media 104. In the illustrated embodiment, electronic device 102 further includes storage 206 (which in turn may store instruction 208), user interface 210 (which may include one or more of an audio component, graphical user interface, virtual reality component, augmented reality component, camera component, location component, date and time component, and/or other components), and processor/circuitry 212. A bus (not shown in FIG. 2) may be used to interconnect the various elements of electronic device 102 and transfer data between these elements.

Connectivity interface 202 may interface electronic device 102 to communication media 104, such that electronic device 102 may be communicatively coupled to server system 106 via communication media 104. Transceiver 204 of connectivity interface 202 may include multiple transceivers operable on different wireless standards. Transceiver 204 may be used to send/receive content, user input, security and encryption information, and/or other information to/from server system 106. Additionally, connectivity interface 202 may include additional components for controlling radio and/or wired connections, such as baseband and/or Ethernet modems, audio/video codecs, and so on.

Connectivity interface 202 may interface electronic device 102 to communication media 104, such that electronic device 102 may be communicatively coupled to server system 106 via communication media 104. Transceiver 204 of connectivity interface 202 may include multiple transceivers operable on different wireless standards. Transceiver 204 may be used to send/receive content, user input, security and encryption information to/from other electronic devices and/or server system 106. Additionally, connectivity interface 202 may include additional components for controlling radio and/or wired connections, such as baseband and/or Ethernet modems, audio/video codecs, and so on.

In embodiments, transceiver 204 may utilize Bluetooth, ZIGBEE, Wi-Fi, GPS, cellular technology, or some combination thereof. Further, although FIG. 2 illustrates a single transceiver 204 in electronic device 102 for transmitting/receiving information, separate transceivers may be dedicated for communicating particular types of data or for doing so in particular fashions. In some cases, transceiver 204 may include a low energy transmitter/receiver such as a near field communications (NFC) transmitter/receiver or a Bluetooth Low Energy (BLE) transmitter/receiver. In further example implementations, separate wireless transceivers may be provided for receiving/transmitting high fidelity audio and/or video data. In yet additional embodiments, a wired interface (e.g., micro-USB, HDMI, etc.) may be used for communicating data between electronic device 102 and server system 106.

Storage 206 may include volatile memory (e.g., RAM) and/or non-volatile memory (e.g., flash storage), may include any of EPROM, EEPROM, cache, or may include some combination/variation thereof. In various embodiments, storage 206 may store content, user input, and/or other data collected by electronic device 102 (e.g., security and encryption information, etc.). Storage 206 may also be used to store downloaded content (e.g., text, photos, videos, virtual reality content, augmented reality content, and so on) for later retrieval and use, e.g., in connection with presenting an interactive narrative. Additionally, storage 206 may store instructions 208 that, when executed using processors/circuitry 212, for example, can cause electronic device 102 to perform various operations that will be described in further detail herein. Instructions 208 may be used for processing user input and/or presenting content, according to various operations described herein.

Instructions 208 may be downloaded, installed, and/or initially configured/setup on electronic device 102. For example, electronic device 102 may obtain instructions 208 from server system 106, or from another source accessed via communication media 104, such as an application store or the like. Following installation and setup, instructions 208 may be used to access content, user input, security and encryption information, and/or other information, as will be described herein. Instructions 208 may also be used to interface with other electronic devices, for example, to receive content, user input, security and encryption information, and/or other information from electronic device 102 and/or server system 106, as will be described herein.

Instructions 208 may include various code/functional modules involving, for example, content, user input, security and encryption information, etc. These modules may be implemented separately or in combination. Each module may include computer-readable media and have computer-executable code stored thereon, such that the code may be operatively coupled to and/or executed by processors/circuitry 212 to perform specific functions (e.g., as described herein with regard to various operations and flow diagrams, etc.) with respect to presenting an interactive narrative and tasks related thereto. Instructions 208 may include a native application modified with a software design kit (e.g., depending on the operating system) in order to carry out the functionalities/features described herein.

Electronic device 102 may include user interface 210. User interface 210 may be the component presenting content to the user and receiving user input, as will be described in greater detail herein.

Referring further to FIG. 2, as mentioned herein, electronic device 102 may also include processor/circuitry 212. Processor/circuitry 214 may include a processor or processor modules, including, by way of example, an applications processor that interfaces with and/or controls other elements of electronic device 102 (e.g., connectivity interface 202, transceiver 204, storage 206, instructions 208, and/or user interface 210). Processor/circuitry 214 may include a controller that provides various controls (e.g., interfaces with buttons and switches) related to the operation of electronic device 102, user interface 210, and the like, and interfaces with drivers of various audio/visual components of electronic device 102. Additionally, the controller may include various controls related to the user interface operation, content operation, and/or other operations, such as will be described in further detail herein.

Processor/circuitry 214 may include processors (including, in some instances, logic circuits), memory, a battery and power circuitry, and other circuitry drivers for periphery components, such as user interface 210, and/or audio/visual/haptic interfaces that may be included in user interface 210. Processor/circuitry 214 and any processors thereof may include logic circuits for receiving, processing, and/or storing content or information received, transmitted, delivered by, generated by, and/or data input to electronic device 102 and/or server system 106.

More particularly, as shown in FIG. 2, processor/circuitry 214 may be coupled by a bus (not shown) to connectivity interface 202 (including transceiver 204) and storage 206 (including instructions 208), as well as to user interface 210. Hence, processor/circuitry 214 may receive and process electrical signals generated by these respective elements and, thus, perform various functions. By way of example, processor/circuitry 214 may access stored content from storage 206 at the direction of instructions 208. Additionally, processor/circuitry 214 may process the stored content for transmission via connectivity interfaces 202 and communication media 104 to each other (electronic device 102), as well as server system 106.

In embodiments, logic circuits of processor/circuitry 214 may further detect, calculate, and/or store data (e.g., content, user input, etc.) received from user interface 210 or another remote source (e.g., from server system 106). The logic circuits may use this input to present an interactive narrative on electronic device 102. Processor/circuitry 214 may be used to drive/control and/or gather information from other peripheral components not shown in detail in FIG. 2. For example, processor/circuitry 214 may interface with the various components of user interface 210 that may be used to capture user input, as will be described herein, including mechanisms and information relating to capturing text, audio input, visual input, motion capture input, and/or other inputs using user interface 210. Processor/circuitry 214 may also interface with video input/output mechanisms such as HDMI, USB, and the like.

Figure 3:
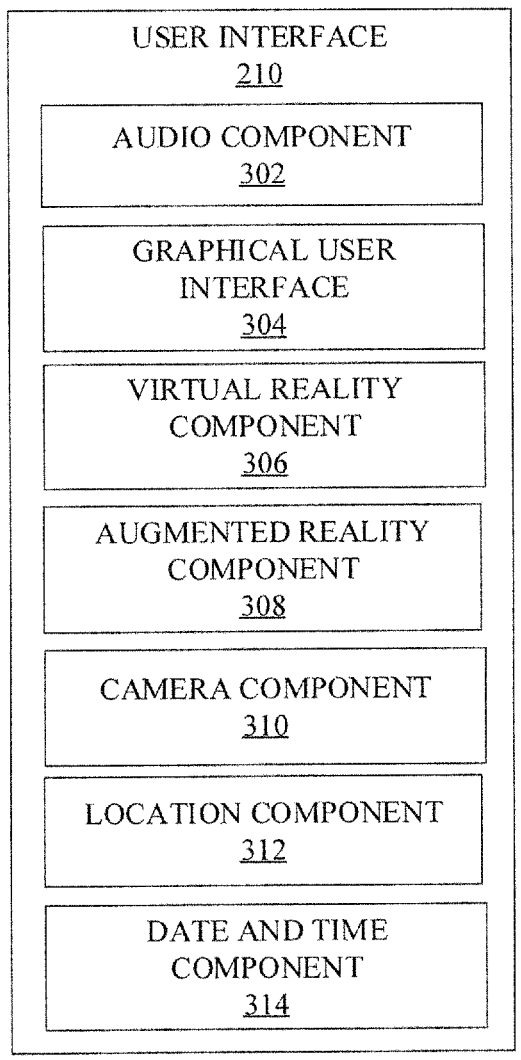
FIG. 3 illustrates an example user interface in accordance with embodiments of the disclosure.

FIG. 3 depicts example user interface 210, which includes an example of additional aspects of the present disclosure that may be implemented in connection with example environment 100. By way of example, the various below-described components of FIG. 3 may be used to present an interactive narrative to a user.

For example, the first piece of content may be presented to the user via user interface 210. The first piece of content may be presented as text (e.g., graphical user interface 304, virtual reality component 306, augmented reality component 308, etc.), audio (e.g., audio component 302), graphics (e.g., graphical user interface 304, virtual reality component 306, augmented reality component 308, etc.), and/or other formats. Electronic device 102 may simultaneously receive user input via user interface 210. The user input may be in the form of text (e.g., graphical user interface 304), verbal (e.g., audio component 302, virtual reality component 306, augmented reality component 308, etc.), gestures (e.g., graphical user interface 304, virtual reality component 306, augmented reality component 308, camera component 310, etc.), location of electronic device 102 (e.g., location component 312), date and time corresponding to electronic device 102 (e.g., date and time component 314), and/or other input. As described herein, server system 106 may process the user input and generate, obtain, or determine an appropriate response based on the processed user input. In some embodiments, processor/circuitry 212 may perform these operations. In embodiments, pre-generated content may be stored in storage 110 and/or storage 206. The response presented as a second piece of content to the user via user interface 210. As described herein, the second piece of content may be presented in various formats.

As illustrated, user interface 210 may include audio component 302 (e.g., speakers, microphones, etc.), graphical user interface 304 (e.g., interactive display), virtual reality component 306 (e.g., virtual reality headset, virtual reality device, remote controllers, etc.), augmented reality component 308 (e.g., augmented reality headset, augmented reality device, remote controllers, etc.), camera component 310 (e.g., camera, optical capture device, etc.), location component 312 (e.g., GPS, RFID, Bluetooth®, WLAN, etc.), and date and time component 314 (e.g., clock, calendar, timer, etc.).

In embodiments, user interface 210 may be configured to enable electronic device 102 to simultaneously present a story while being able to receive user input. For example, while the narrative is being presented using speakers, a user may be able to ask a question aloud, and electronic device 102 will be able to receive the question. The narrative may be otherwise interruptible. In some embodiments, the narrative may present pauses at natural points in the narrative for comments or questions from the user.

In embodiments, user input may include suggested phrase structures and keywords. In other embodiments, the user input may include any type of user input, as described herein.

User interface 210 may include audio component 302. In embodiments, audio component 302 may be integrated into and/or implemented in connection with instructions 208. Audio component 302 may enable electronic device 102 to be capable of receiving audio input and presenting audio content. Audio component 302 may include one or more microphones, speakers, and/or other audio components to receive and present audio. The microphone may be configured to receive user input. In some embodiments, the audio input may be processed into text using audio recognition, natural language understanding, and/or other speech to text systems, which will be further processed by response generation component 114. The speaker may present the content. For example, continuing the example above with the group of people involved in a race around the world, the narrative may be presented through audio component 302 by listing the group of people: "Rory, Blake, and Alex," and a user may ask, speaking aloud to audio component 302, "Can you tell me more about Blake?"

User interface 210 may include graphical user interface 304. In embodiments, graphical user interface 304 may be integrated into and/or implemented in connection with instructions 208. Graphical user interface 304 may enable electronic device 102 to be capable of receiving text, haptic, visual, media, gesture-based input, and/or other inputs and presenting visual content, which may include, for example, text, photos, and videos. Graphical user interface 304 may include one or more interactive displays, and/or other components to receive input and present content. In some embodiments, graphical user interface 304 may be configured to display media content corresponding to the narrative at a given point in time and may be configured to receive user input. For example, continuing the example above, pictures and/or videos may be displayed corresponding to Rory, Blake, and Alex as the characters are introduced. In some embodiments, machine learning systems may be used to generate visual content that aligns with the narrative at a given point in time. In one example, the user may interact with the story by typing, texting, sending data (e.g., audio files, pictures, videos), and/or other input. In embodiments, the non-text input may be processed into text using audio or visual recognition, and/or other systems, which will be further processed by response generation component 114.

User interface 210 may include virtual reality component 306. In embodiments, virtual reality component 306 may be integrated into and/or implemented in connection with instructions 208. Virtual reality component 306 may enable electronic device 102 to be capable of receiving input via remote controllers, gestures, and/or other devices, as well as other inputs and presenting virtual reality content, which may include, for example, immersive visual, audio, and haptic environments. Virtual reality component 306 may include one or more dynamic audio/visual/haptic displays, remote controllers, motion capture sensors, and/or other components to receive input and present content. In some embodiments, virtual reality component 306 may be configured to display virtual reality media content in a virtual environment. In some embodiments, machine learning systems may be used to generate virtual reality content that aligns with the narrative at a given point in time.

User interface 210 may include augmented reality component 308. In embodiments, augmented reality component 308 may be substantially similar to virtual reality component 306, except that the virtual environment may be overlaid onto a real-world environment. For example, continuing the example above, a virtual representation of Rory running past the user may be presented and overlaid onto the real-world environment surrounding the user.

User interface 210 may include camera component 310. In embodiments, camera component 310 may be integrated into and/or implemented in connection with instructions 208. Camera component 310 may enable electronic device 102 to be capable of capturing a real-time view of a physical, real-world environment, and/or capturing motions from the user. Camera component 310 may include one or more cameras for capturing the real-world scene, which may then be displayed to the user through electronic device 102. As used herein, a visual scene may refer to a view(s) of the real-world environment. For instance, a visual scene may be a series of images, or video, of a real-world environment. In some embodiments, the camera component could capture and translate body posture indicating attentiveness or interest, excitement, fear, etc. In embodiments, the camera component may be able to capture and translate sign language into text.

Electronic device 102 may include location component 312. In embodiments, location component 312 may be integrated into and/or implemented in connection with instructions 208. Location component 312 may include one or more locators to locate electronic device 102. Locators may include GPS receivers, cellular network receivers, Bluetooth®, global positioning system (GPS), cell tower triangulation, Geographic Information Systems (GIS), RFID, WLAN, and/or other locators. In embodiments, when a location component is activated, the specific location may be used in generating a pre-defined category. In some embodiments, the location of the electronic device may be used as a setting in the narrative. Locators may provide location information to server system 106.

Electronic device 102 may include date and time component 314. In embodiments, date and time component 314 may be integrated into and/or implemented in connection with instructions 208. Date and time component 314 may include a clock and calendar. The clock and calendar may be used in generating a pre-defined category. For example, around October, Halloween stories may be presented more often than in June. Similarly, scary stories may be offered more regularly at night than during the day. The impact of the date and time component on the pre-defined categories may be manually adjusted by the user, such that scary stories are not presented at night, or not presented at all.

In some embodiments, the components of the user interface may be in combination to affect what is presented to the user. For example, the electronic device may be located in the United States on July 4; as a result, stories including fireworks or American independence may be presented. In another example, the electronic device may be located in France on July 14; as a result, stories related to Bastille Day or the French Revolution may be presented to a user. A person of ordinary skill in the art will recognize how the other components may be used together.

Figure 4:
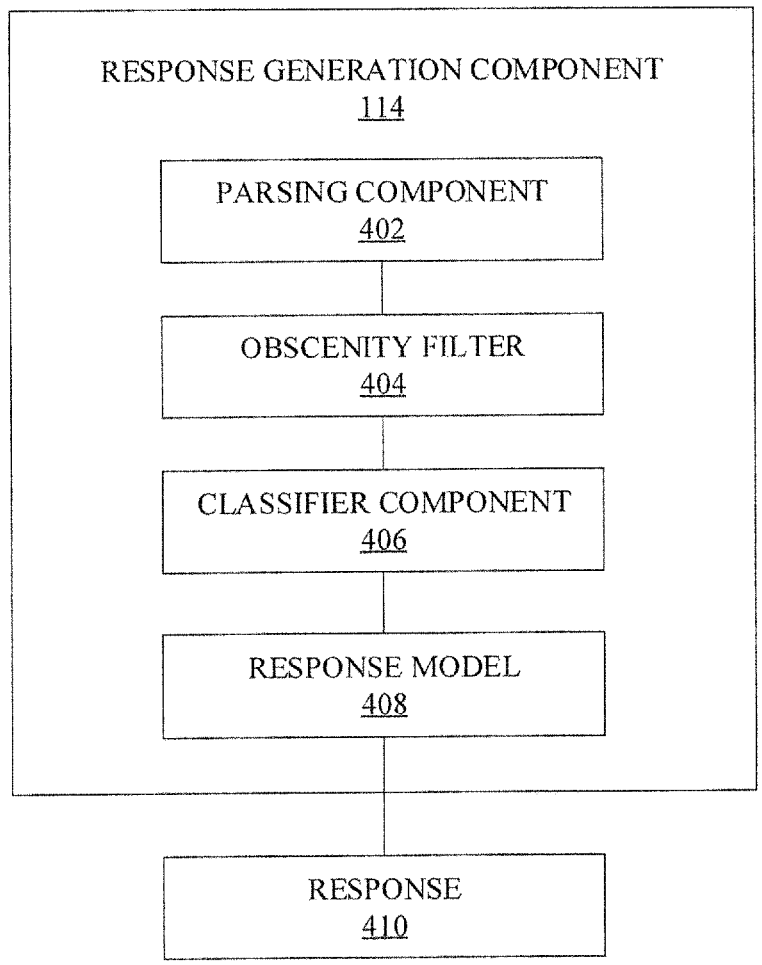
FIG. 4 illustrates an example response generation component, in accordance with embodiments of the disclosure.

FIG. 4 depicts example response generation component 114, which includes an example of additional aspects of the present disclosure that may be implemented in connection with example environment 100. As illustrated, response generation component 114 may include parsing component 402, obscenity filter 404, classifier component 406, and response models 408.

Response generation component 114 may receive a user input. The user input may be parsed to extract one or more component parts by parsing component 402. In some embodiments, parsing component 402 may be a system configured to operate in accordance with one or more algorithms designed to separate the user input into its component parts. These component parts may be, for example, words, numbers, smaller phrases, etc. that can be used to identify the grammatical structure and meaning of the user input. Metadata may be generated for the component parts based on the corresponding linguistic traits, such as parts of speech, grammar, syntax, semantics, morphology, phonology, phonetics, sentence structures, etc. how the component parts relate to each other, keywords, and/or other information on the user input. One of ordinary skill in the art would understand that different parsing algorithms and/or a combination of different parsing algorithms may be used to achieve the desired parsing in accordance with various embodiments.

In some embodiments, one or more corpora or other data sources may include classification keywords and/or other techniques to control how the user input is classified. The one or more corpora may include content, where individual pieces of content may correspond to metadata indicating how the individual pieces of content correspond to the narrative. For example, multiple pre-generated content may correspond to Blake. The pre-generated content may include a side story, what he is wearing, who he meets, what he looks like, how he talks, etc. Based on classified user input, whether through keywords, syntactical analysis, semantic analysis, or other classifications, metadata may be generated on the user input corresponding to Blake's looks. As a result, one of the pieces of pre-generated content corresponding to his looks may be presented.

In another example, continuing the example, content about Rory may have been pre-generated and include what he is wearing, what he looks like, and what he likes to do. The pre-generated content may indicate Rory is a boy wearing a red shirt, jeans, and black shoes. It may also indicate Rory likes to swim and rock climb. One of the one or more corpora may include keywords such as "Rory," "color," "gender," "boy," "clothes," "wear," etc. When response generation component 114 receives user input with these keywords, or user input corresponding to these keywords, response generation component 114 may present a second piece of content corresponding to the keyword. For example, if a user asked "What is Rory wearing?", response generation component 114 would note "Rory" and "wear" as keywords and present "Rory is wearing a red shirt, jeans, and black shoes."

In embodiments, response generation component 114 may parse user input in a more complex fashion using various parsing algorithms. Some examples of parsing algorithms include, but are not limited to those that are based on lexical functional grammar, head-driven phrase structure grammar, dependency grammar, syntactic analysis, semantic analysis, etc. In embodiments, syntactic analysis may include lemmatization, morphological segmentation, part-of-speech tagging, sentence breaking, stemming, word segmentation, terminology extraction, and/or other tasks.

For example, the user's input may be broken up into syntactic and semantic parts (agent/subject, verb/action, passive or receiving object) and the relevant questioning particle identified to determine which part of the sentence corresponds to the narrative. For example, a user could ask "Wait, what was the third racer's name?" The user input could be parsed to identify "what [Q-N] was [V-Past] the [Def.Article] third [A] racer [N]'s [poss] name [N]," where [Q] stands for question, [N] stands for noun, [V] stands for verb, [Past] stands for past tense, [Def.Article] stands for definite article, [A] stands for adjective, and [poss] stands for possessive. Response generation component 114 could identify that the [Q-N] component part ("what") refers to the noun phrase "the third racer's name." Response generation component 114 may look in storage 110 and/or storage 206 for the most appropriate match for "third racer's name" and respond with a second piece of content: "The third racer was named Rory, and he loved climbing rocks and painting landscapes."

In embodiments, parts of speech, actions, subject- and object-verb relationships, entities, and/or other linguistic elements may be identified in the user input. Each identified component of the user input would receive tags corresponding to the metadata in the content. For example, response generation component 114 may present a first piece of content: "The racers were Alex, Blake, and Rory." A user may provide input stating "Tell me more about the last boy." Response generation component 114 would tag "the last boy" as a noun phrase referring to a male gendered entity and as a final item in a list structure. If the first piece of content was pre-generated, the sentence would already have metadata corresponding to the sentence that would indicate "Rory" is a proper noun name, male gendered, and final in a list structure. If the first piece of content was dynamically generated, response generation component 114 would also generate metadata corresponding to the first piece of content, such as that just described. With the metadata for the content and the metadata for the user input, response generation component 114 would be able to obtain or generate a second piece of content about Rory, as described herein.

In embodiments, semantics may include lexical semantics, named entity recognition (NER), natural language generation, natural language understanding, optical character recognition (OCR), question answering, recognizing textual entailment, relationship extraction, sentiment analysis, topic segmentation and recognition, word sense disambiguation, and/or other tasks.

After the user input has been parsed into its component parts, the user input is filtered by obscenity filter 404. Obscenity filter 404 may use the component parts of the user input and compare them against obscene words and/or ideas. Even though user input may correspond to the characters and the setting, the user input may correspond to inappropriate, or obscene, material. When obscenity filter 408 determines a probability that is over a threshold value, as described in greater detail below with respect to classifier component 406, the user input is ignored and the narrative continues where it left off. By providing obscenity filter 408 after parsing component 402, processing power is reduced for obscene user input because further processing may be stopped after obscenity filter 408 determines user input is obscene. In some embodiments, if repeated user input is determined to be obscene, the narrative may end. In embodiments, a final piece of content may be presented indicating the story is ending. For example, after repeated obscene user input, electronic device 102 may present, "It seems like now is not a good time for a story. Bye."

Once the user input has been parsed into its component parts, classifier component 406 may make a determination as to which one of response models 406 should be used to determine a response. In the illustrated example of FIG. 4, classifier component 406 may make a determination whether the user input corresponds to the narrative, e.g., the user input is somehow connected to the narrative based on at least one of the one or more characteristics, or the user input does not correspond to the narrative. The manner in which classifier component 406 is implemented may vary in accordance with different embodiments.

In some embodiments, classifier component 406 may be implemented as a "hardcoded" algorithm/software in which matching operations can be performed to match one or more keywords resulting from the parsing process with keywords corresponding to the narrative. In this way, the response model to be used can be determined based solely on the keywords themselves.

In some embodiments, classifier component 406 may be a trained machine learning classification model. The machine learning may include, for example, decision trees and forests, hidden Markov models, statistical models, cache language model, and/or other models. The machine learning may be unsupervised, semi-supervised, and/or incorporate deep learning techniques. Classifier component 406 may be trained with one or more corpora deemed to fall within a given narrative. One of ordinary skill in the art would understand that different training mechanisms may be used resulting in a classifier component that can be based on, e.g., a random forest model, a support vector machine, a neural network, and/or other machine learning systems that utilize algorithms such as logistic and/or linear regression to predict in what class the user input may belong.

It should be understood that classifier component 406 can, in some embodiments, be trained to operate with a variety of different response models, e.g., different types or implementations of a language generation model and/or pre-generated content. For example, different narrative response models may exist and may be used depending on a determined narrative. Different response models, based on their method of operation, may be suited for different user inputs. In some embodiments, a narrative may include dynamically generated content based on natural language generation using machine learning trained on one or more corpora. In embodiments, the narrative may include pre-generated content that includes metadata on a general structure of the narrative. The pre-generated content may also be broken up into component parts, such that each component part includes metadata, as described herein. In other embodiments, a combination of both dynamically generated and pre-generated content may be used to present a narrative.

It should also be understood that although two response models are described, embodiments of the present disclosure are not limited to the use of just two response models. Parsing component 402 and classifier component 406 can be adapted to work with any number of response models.

In some embodiments, a weighting system may be used, where a classification determination may be assigned some confidence level or scalar value. Classifier component 406 may be configured to make such a prediction/initial determination regarding the component parts parsed from the user input. In some embodiments, the assigned scalar value may be a probability score or value that is associated with each component part. Depending on whether a component is more likely to be associated with one of the plurality of response models 408, classifier component 406 may output a determination of a response model. In some embodiments, classifier component 406 may make this determination based upon an aggregate probability score. For example, in a simple keyword-based classifier, an input like "Will Rory win?" may be parsed and the component parts "Rory" and "win" may each receive a "narrative" score mark of 1, for a total "narrative" score of 2 out of 3 words, or 0.66. The component part "Will" may receive a "non-narrative" score of 1, for a total "non-narrative" score of 1 out of 3 words, or 0.33. In other embodiments, the classifier component 406 may make this determination based on interactions between different component part probabilities, and component part combination probabilities. In still other embodiments, the classifier component 406 may make this determination based on semantic vector features and the computed probabilities associated with vectors during training of the classifier model.

The initial determination to generate a response with a particular response model may be refined. In some embodiments, a comparator compares the probability score assigned by classifier component 406 to a threshold. The comparison may be used to ultimately determine which response model is used to generate a response to the user input. For example, one component part parsed from the user input may be assigned a probability score indicating that there is a 40% probability that the user input corresponds to the narrative. Another component part parsed from the user input may be assigned a probability score indicating that there is an 80% probability that the user input corresponds to the narrative. The comparator may, based, for example, on a 51% probability threshold, determine that a narrative response model for user inputs should be used. The probability threshold may range from about 15% to about 85%. The comparator may weight different component parts of the user input differently or average the user input. The thresholds used by the comparator can vary and/or be adapted for different scenarios.

Some embodiments may use multiple response models 408 of a particular type. Upon selecting a response model to determine a response to the user input, the selected response model, which in this example includes either narrative response model or non-narrative response model, processes the parsed user input. Following the above example, if the comparator determines that a narrative response model should be used to generate a response to the user input, and multiple narrative response models are implemented, each of the multiple narrative response models can generate a response. The responses from the multiple narrative response models may place the user input in context of what has been told so far in the narrative, what is included in the narrative, the different endings of the narrative, the different branching off points available in the narrative, the characters of the narrative, and/or other characteristics of the narrative. In embodiments, the responses may be generated using natural language generation. In some embodiments, the responses may be obtained from storage based on metadata corresponding to the content of the responses. The content may be broken up into component parts, such that each component part corresponds to its own metadata. In some embodiments, a combination of natural language generation and pre-generated content may be used.

In other embodiments, the non-narrative response model may be used. The non-narrative response model may apply to all other user input that is not placed into the narrative response model. Once user input is processed into the non-narrative response model, the processing may be substantially similar to the processing of user input in the narrative response model. However, in some embodiments, the non-narrative response model may include one or more corpora of pre-generated content that correspond with component parts parsed from the user input by parsing component 402. Such a model can be referred to as a retrieval-based model. In some embodiments, a narrative response model may be a generative language model based on generative neural network models, or other machine learning systems, that may generate a novel response, word by word, rather than a pre-generated phrase, or otherwise use natural language generation. The machine learning systems may train, not only on one or more corpora corresponding to the type of narrative, but also language databases that may allow for more flexibility and coherency of dynamically generated content. Other types of narrative response models may be used in accordance with various embodiments.

In some embodiments, response generation component 114 may include a verification loop (not shown) to confirm user input. For example, if classifier component 406 is close to a threshold value (e.g., within about 1% to about 20%), whether it is about to breach the threshold value or has just breached the threshold value, response generation component 114 may respond with pre-generated clarification questions to prompt the user to re-present the input and allow classifier component 406 to try and classify the user input again: "Could you explain what you mean by that?"

In some embodiments, response generation component 114 may include user input in forming the clarification question. For example, the user input may have been "Tell me more about the last boy," and response generation component 114 may not have parsed "last" as matching the final list entity, and instead may use the metadata corresponding to "boy" which could be translated as "male child" to inform its clarification question. Response generation component 114 may process at least some of the user input in the following order: "Tell me more about the last boy," then "the last boy", which response generation component 114 incorrectly only corresponds to "male child." As a result, response generation component 114 may present a second piece of content: "Do you mean Rory, Blake, or Alex?"

Having described some of the various elements of environment 100, and electronic device 102 shown in FIGS. 1-4, an example embodiment using some of these elements for the presentation of an interactive narrative will now be provided. In this non-exhaustive example, electronic device 102 and server system 106 may be used to present an interactive narrative on electronic device 102, as follows. Storage 206 may store instructions 208 that when executed by processor/circuitry 212 cause user interface 210 to present a first piece of content corresponding to a narrative. The first piece of content may be stored in storage 110 or storage 206. In some embodiments, the first piece of content may be generated by response generation component 114. A user may provide input to electronic device 102. The user input may be sent to server system 106 via communication media 104. Server system 106 may parse the user input. Server system 106 may classify the user input into a response model. In some embodiments, response generation component 114 may parse, filter, and classify the user input. Server system 106 may determine a second piece of content to be presented based on a selected response model. In embodiments, the second piece of content may be obtained from storage 110 or generated by response generation component 114. Electronic device 102 may receive a second piece of content based on the response model corresponding to the user input. Electronic device 102 may present the second piece of content to the user. In embodiments, electronic device 102 may be able to perform all operations of server system 106 and its corresponding components. In some embodiments, the disclosed technology may be presented on a single package or device.

Figure 5:
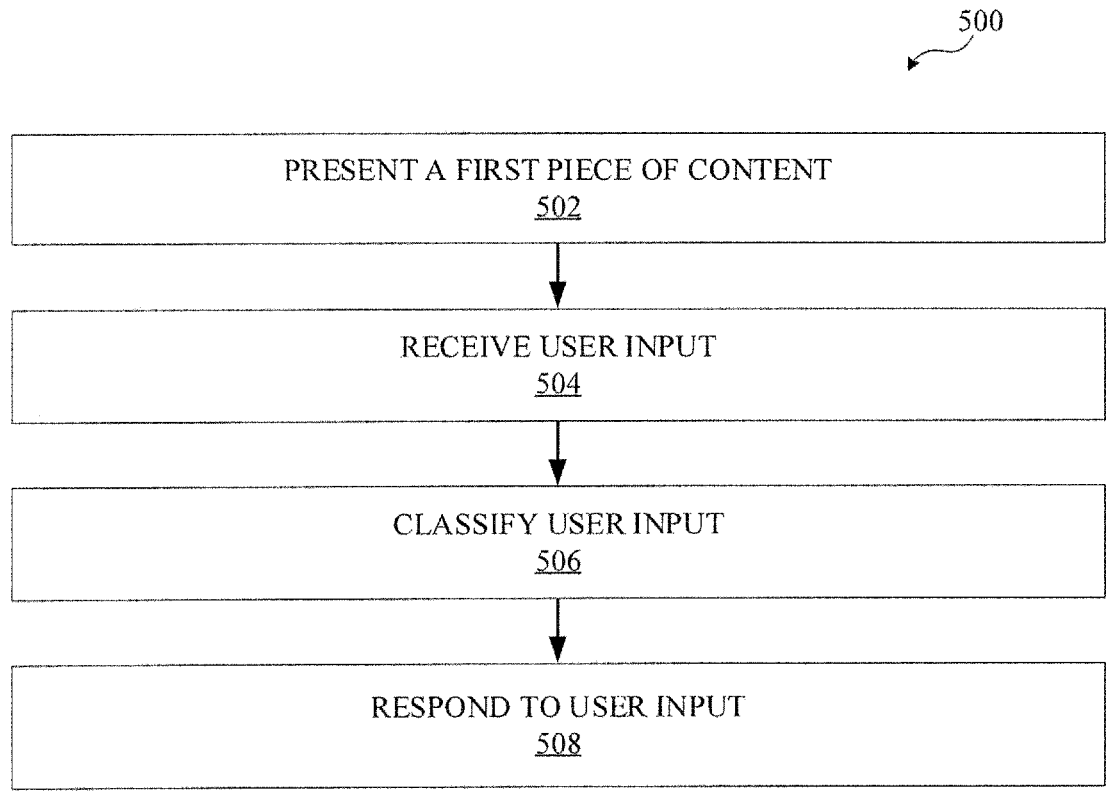
FIG. 5 is a flow chart illustrating example operations that may be performed in accordance with embodiments of the disclosure.

FIG. 5 is a flow diagram illustrating various operations of method 500, and accompanying embodiments for presenting an interactive narrative, in accordance with aspects of the present disclosure. The operations of the various methods described herein are not necessarily limited to the order described or shown in the figures, and one of skill in the art will appreciate, upon studying the present disclosure, variations of the order of the operations described herein that are within the spirit and scope of the disclosure.

The operations and sub-operations of method 500 may be carried out, in some cases, by one or more of the components, elements, devices, modules, and circuitry of environments 100, electronic device 102 (including the corresponding components of electronic device 102, such as user interface 210 and its corresponding components), communication media 104, server system 106, server 108, processor 112, response generation component 114, and/or computing module 600, described herein and referenced with respect to at least FIGS. 1-4 and 6, as well as sub-components, elements, devices, modules, and circuitry depicted therein and/or described with respect thereto. In such instances, the description of methods 500 may refer to a corresponding component, element, etc., but regardless of whether an explicit reference is made, one of skill in the art will recognize, upon studying the present disclosure, when the corresponding component, element, etc. may be used. Further, it will be appreciated that such references do not necessarily limit the described methods to the particular component, element, etc. referred to. Thus, it will be appreciated by one of skill in the art that aspects and features described above in connection with (sub-) components, elements, devices, modules, circuitry, etc., including variations thereof, may be applied to the various operations described in connection with methods 500 without departing from the scope of the present disclosure.

Referring now to FIG. 5, aspects of method 500 for presenting an interactive narrative are depicted. At operation 502, method 500 includes presenting a first piece of content. As previously noted, the interactive narrative system may include a mobile device, computing device, virtual reality device, augmented reality device, and/or other devices. Accordingly, the user input may be auditory, visual, gesture-based, and/or text-based received through a user interface. In some embodiments, the first piece of content may correspond to a given narrative. The given narrative may include one or more characteristics.

At operation 504, method 500 includes receiving user input via the user interface. At operation 506, method 500 includes classifying the user input into one of a plurality of response models. Classifying the user input may include parsing the user input into component parts, as described herein. The component parts may then be filtered based on obscenity filter 404. If the user input is filtered out based on obscenity, the second piece of content may continue where the first piece of content ended. If the user input is not filtered out, the user input is classified into one of the plurality of response models. For example, the response models may include a narrative response model and a non-narrative response model.

At operation 508, method 500 includes responding to the user input. The response, including a second piece of content, is based on which response model is selected. When a narrative response model is selected, a second piece of content continuing the narrative may be pre-generated or dynamically generated based on the user input, as described herein. When a non-narrative response model is selected, a pre-generated response may be presented indicating the narrative does not/will not include such content. In some embodiments, a dynamically generated response may be presented based on keywords in the user input.

Figure 6:
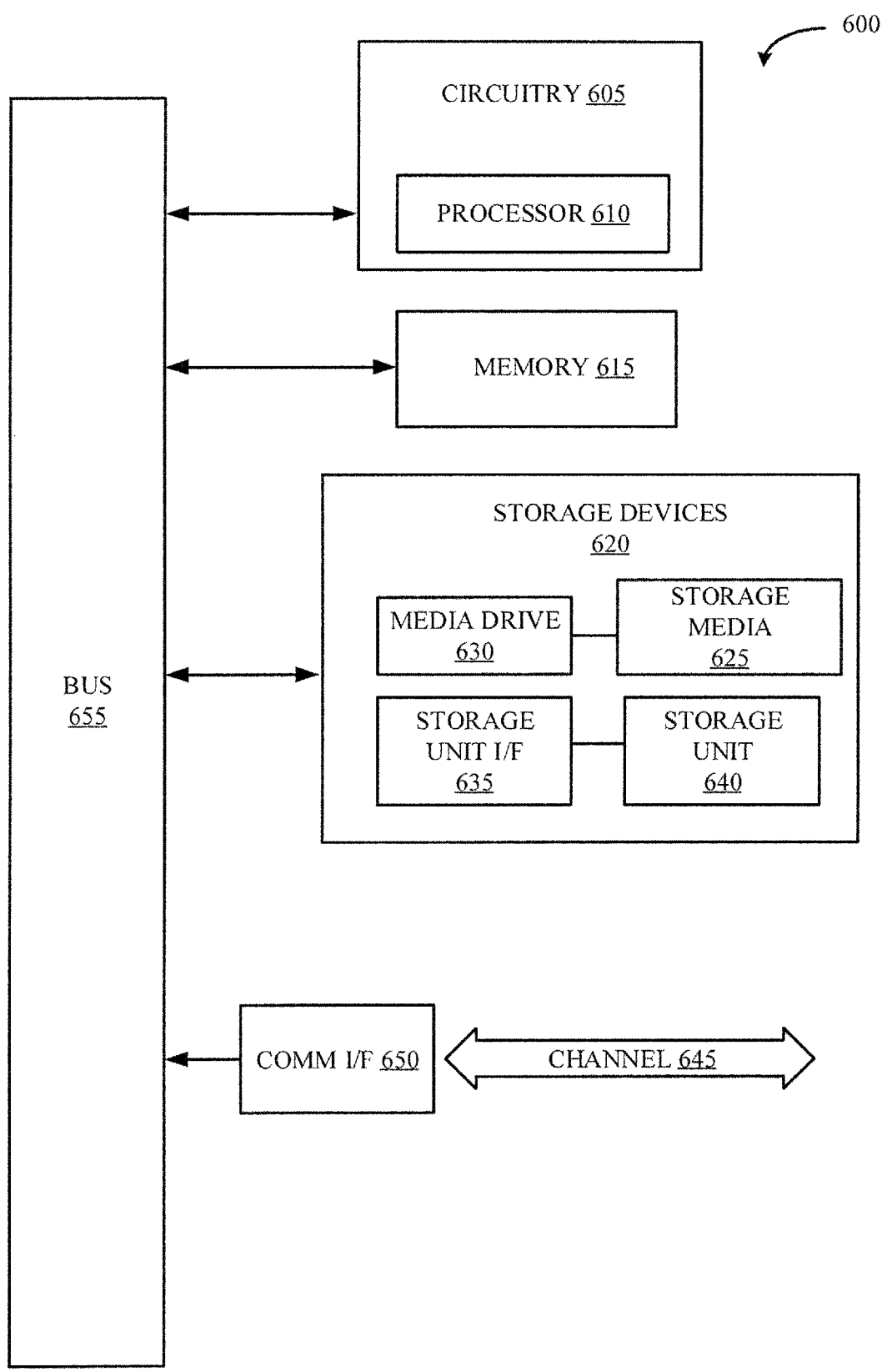
FIG. 6 illustrates an example computing module that may be used to implement features of various embodiments of the disclosure.

FIG. 6 illustrates example computing module 600, which may in some instances include a processor/controller resident on a computer system (e.g., server system 106 and/or device 102). Computing module 600 may be used to implement various features and/or functionality of embodiments of the systems, devices, and methods disclosed herein. With regard to the above-described embodiments set forth herein in the context of systems, devices, and methods described with reference to FIGS. 1-5, including embodiments involving device 102 and/or server system 106, one of skill in the art will appreciate additional variations and details regarding the functionality of these embodiments that may be carried out by computing module 600. In this connection, it will also be appreciated by one of skill in the art upon studying the present disclosure that features and aspects of the various embodiments (e.g., systems) described herein may be implemented with respected to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines, or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand upon studying the present disclosure that these features and functionality may be shared among one or more common software and hardware elements, and such description shall not require or imply that separate hardware or software components are used to implement such features or functionality.

Where components or modules of the application are implemented in whole or in part using software, in embodiments, these software elements may be implemented to operate with a computing or processing module capable of carrying out the functionality described with respect thereto. One such example computing module is shown in FIG. 6. Various embodiments are described in terms of example computing module 600. After reading this description, it will become apparent to a person skilled in the relevant art how to implement example configurations described herein using other computing modules or architectures.

Referring now to FIG. 6, computing module 600 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 600 is specifically purposed.

Computing module 600 may include, for example, one or more processors, controllers, control modules, or other processing devices, such as a processor 610, and such as may be included in circuitry 605. Processor 610 may be implemented using a special-purpose processing engine such as, for example, a microprocessor, controller, or other control logic. In the illustrated example, processor 610 is connected to bus 655 by way of circuitry 605, although any communication medium may be used to facilitate interaction with other components of computing module 600 or to communicate externally.

Computing module 600 may also include one or more memory modules, simply referred to herein as main memory 615. For example, random access memory (RAM) or other dynamic memory may be used for storing information and instructions to be executed by processor 610 or circuitry 605. Main memory 615 may also be used for storing temporary variables or other intermediate information during execution of instructions to be executed by processor 610 or circuitry 605. Computing module 600 may likewise include a read only memory (ROM) or other static storage device coupled to bus 655 for storing static information and instructions for processor 610 or circuitry 605.

Computing module 600 may also include one or more various forms of information storage devices 620, which may include, for example, media drive 630 and storage unit interface 635. Media drive 630 may include a drive or other mechanism to support fixed or removable storage media 625. For example, a hard disk drive, a floppy disk drive, a magnetic tape drive, an optical disk drive, a CD or DVD drive (R or RW), or other removable or fixed media drive may be provided. Accordingly, removable storage media 625 may include, for example, a hard disk, a floppy disk, magnetic tape, cartridge, optical disk, a CD or DVD, or other fixed or removable medium that is read by, written to or accessed by media drive 630. As these examples illustrate, removable storage media 625 may include a computer usable storage medium having stored therein computer software or data.

In alternative embodiments, information storage devices 620 may include other similar instrumentalities for allowing computer programs or other instructions or data to be loaded into computing module 600. Such instrumentalities may include, for example, fixed or removable storage unit 640 and storage unit interface 635. Examples of such removable storage units 640 and storage unit interfaces 635 may include a program cartridge and cartridge interface, a removable memory (for example, a flash memory or other removable memory module) and memory slot, a PCMCIA slot and card, and other fixed or removable storage units 640 and storage unit interfaces 635 that allow software and data to be transferred from removable storage unit 640 to computing module 600.

Computing module 600 may also include a communications interface 650. Communications interface 650 may be used to allow software and data to be transferred between computing module 600 and external devices. Examples of communications interface 650 include a modem or softmodem, a network interface (such as an Ethernet, network interface card, WiMedia, IEEE 602.XX, or other interface), a communications port (such as for example, a USB port, IR port, RS232 port Bluetooth® interface, or other port), or other communications interface. Software and data transferred via communications interface 650 may typically be carried on signals, which may be electronic, electromagnetic (which includes optical) or other signals capable of being exchanged by a given communications interface 650. These signals may be provided to/from communications interface 650 via channel 645. Channel 645 may carry signals and may be implemented using a wired or wireless communication medium. Some non-limiting examples of channel 645 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 615, storage unit interface 635, removable storage media 625, and channel 645. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 600 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "process," "processed," "processing," and the like may be used synonymously with "render," "rendered," "rendering," and the like. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. One or more non-transitory computer readable media storing instructions that, when executed by one or more processors, cause the one or more processors to perform the steps of:
    presenting a first piece of content corresponding to a given narrative via a user interface, wherein the given narrative comprises one or more characteristics;
    receiving user input via the user interface;
    selecting, from a plurality of response models, a first response model based on a score assigned to one or more component parts parsed from the user input, wherein each of the plurality of response models comprises a different natural language generation model operating to generate one or more responses that places at least a first portion of the user input in one or more contexts in the given narrative; and
    dynamically generating a response to the user input using the first response model.

2. The one or more non-transitory computer readable media of claim 1, wherein the user interface is configured to simultaneously receive the user input and present the first piece of content.

3. The one or more non-transitory computer readable media of claim 1, wherein the first portion of the user input comprises narrative user input and the first response model comprises
    a narrative response model for the narrative user input corresponding to the one or more characteristics of the narrative.

4. The one or more non-transitory computer readable media of claim 1, wherein the first portion of the user input comprises narrative user input, wherein the first response model comprises a narrative response model for the narrative user input corresponding to the one or more characteristics of the narrative, and wherein the response further includes a second piece of content presented based on the narrative user input.

5. The one or more non-transitory computer readable media of claim 1, wherein a second portion of the user input comprises non-narrative user input, and wherein when executed by the one or more processors, the instructions further cause the one or more processors to perform the steps of dynamically generating a second response to the user input by processing the non-narrative user input using a non-narrative response model, wherein the second response includes a second piece of content indicative of whether the user input does not correspond to the one or more characteristics of the given narrative.

6. The one or more non-transitory computer readable media of claim 1, wherein when executed by the one or more processors, the instructions further cause the one or more processors to perform the steps of:
presenting a second piece of content corresponding to the given narrative; and
continuing the given narrative based on an end of the first piece of content.

7. The one or more non-transitory computer readable media of claim 1, wherein when executed by the one or more processors, the instructions further cause the one or more processors to perform the step of: filtering the user input based on exceeding a threshold value of an obscenity filter.

8. The one or more non-transitory computer readable media of claim 7, wherein exceeding the threshold value of the obscenity filter causes the response to further include a second piece of content that continues the given narrative based on an end of the first piece of content.

9. The one or more non-transitory computer readable media of claim 1, wherein the plurality of response models comprises a plurality of narrative response models.

10. The one or more non-transitory computer readable media of claim 1, wherein the one or more contexts comprise at least one of: what has been told so far in the given narrative, different endings of the given narrative, different branching off points available in the given narrative, or characters of the given narrative.

11. A method for presenting an interactive narrative, the method comprising:
presenting a first piece of content corresponding to a given narrative via a user interface, wherein the given narrative comprises one or more characteristics;
receiving user input via the user interface;
selecting, from a plurality of response models, a first response model based on a score assigned to one or more component parts parsed from the user input, wherein each of the plurality of response models comprises a different natural language generation model operating to generate-one or more responses that places a first portion of the user input in one or more contexts in the given narrative; and
dynamically generating a response to the user input using the first response model.

12. The method of claim 11, wherein the user interface is configured to simultaneously receive the user input and present the first piece of content.

13. The method of claim 11, wherein the response includes a second piece of content dynamically generated using a generative language model.

14. The method of claim 11, wherein the one or more component parts are parsed from the user input using natural language processing.

15. The method of claim 11, wherein selecting the first response model is based on comparing the score assigned to the one or more component parts to a threshold.

16. The method of claim 11, wherein the first portion of the user input comprises narrative user input and the first response model comprises
a narrative response model for the narrative user input corresponding to the one or more characteristics of the narrative.

17. The method of claim 11, wherein the first portion of the user input comprises narrative user input, wherein the first response model comprises a narrative response model for the narrative user input corresponding to the one or more characteristics of the narrative, and the response further includes a second piece of content presented based on the narrative user input.

18. The method of claim 11, further comprising presenting a break in content after the first piece of content.

19. The method of claim 11, further comprising filtering the user input based on exceeding a threshold value of an obscenity filter.

20. The method of claim 19, wherein exceeding the threshold value of the obscenity filter causes the response to further include a second piece of content that continues the given narrative based on an end of the first piece of content.

21. An electronic device comprising:
a memory storing one or more instructions; and
one or more processors that execute the one or more instructions to perform the steps of:
presenting a first piece of content corresponding to a given narrative via a user interface, wherein the given narrative comprises one or more characteristics;
receiving user input via the user interface;
sending the user input to a server;
selecting, from a plurality of response models, a first response model based on a score assigned to one or more component parts parsed from the user input, wherein each of the plurality of response models comprises a different natural language generation model operating to generate one or more responses that place at least a first portion of the user input in one or more contexts in the given narrative; and
dynamically generating, via the server, a response to the user input using the first response model.

22. The electronic device of claim 21, wherein the user interface is configured to simultaneously receive the user input and present the first piece of content.

* * * * *